US009925965B2

(12) United States Patent
Spoeri et al.

(10) Patent No.: US 9,925,965 B2
(45) Date of Patent: Mar. 27, 2018

(54) METHOD AND DEVICE FOR OPERATING A BRAKING SYSTEM

(71) Applicant: Robert Bosch GmbH, Stuttgart (DE)

(72) Inventors: Tobias Spoeri, Ilsfeld (DE); Dirk Drotleff, Oberstenfeld-Gronau (DE); Branimir Tokic, Marbach am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/761,072

(22) PCT Filed: Nov. 21, 2013

(86) PCT No.: PCT/EP2013/074357
§ 371 (c)(1),
(2) Date: Jul. 15, 2015

(87) PCT Pub. No.: WO2014/111182
PCT Pub. Date: Jul. 24, 2014

(65) Prior Publication Data
US 2015/0353064 A1    Dec. 10, 2015

(30) Foreign Application Priority Data
Jan. 16, 2013   (DE) .................. 10 2013 200 604

(51) Int. Cl.
*B60T 8/32*        (2006.01)
*B60T 8/40*        (2006.01)
(Continued)

(52) U.S. Cl.
CPC ............ *B60T 8/3265* (2013.01); *B60L 1/003* (2013.01); *B60L 7/18* (2013.01); *B60T 7/042* (2013.01);
(Continued)

(58) Field of Classification Search
CPC ... B60T 1/10; B60T 8/00; B60T 8/266; B60T 8/268; B60T 8/3275; B60T 8/4275;
(Continued)

(56) References Cited

U.S. PATENT DOCUMENTS 5,568,962 A * 10/1996 Enomoto .................. B60L 7/26
303/152
5,853,229 A * 12/1998 Willmann ................. B60T 1/10
188/DIG. 1
(Continued)

FOREIGN PATENT DOCUMENTS

CN         1978256 A      6/2007
CN      101274623 A     10/2008
(Continued)

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A method for operating a braking system, having a front and rear axle, the braking system including: a brake booster having a brake input element, coupled to an actuating travel sensor for providing a signal of a braking input; a brake master cylinder coupled to the brake booster coupled to a brake medium reservoir; fluid lines, in fluidic communication with the brake master cylinder and the brake medium reservoir, and with braking devices of the wheels via a system of valves, each of the wheels being coupled to a generator generating a braking torque, the method including: generating a hydraulic free travel with the valves and controlling valves with a control unit, a hydraulic pressure build-up for decelerating a wheel speed being prevented by generating free travel during actuation of the brake input element; and generating a regenerative braking torque for decelerating the wheel speed, based on the braking input.

19 Claims, 3 Drawing Sheets

(51) Int. Cl.

| | | |
|---|---|---|
| *B60T 13/16* | (2006.01) | |
| *B60L 1/00* | (2006.01) | |
| *B60L 7/18* | (2006.01) | |
| *B60W 30/18* | (2012.01) | |
| *B60W 50/10* | (2012.01) | |
| *B60W 10/08* | (2006.01) | |
| *B60W 10/184* | (2012.01) | |
| *B60T 7/04* | (2006.01) | |
| *B60T 13/58* | (2006.01) | |
| *B60T 13/66* | (2006.01) | |
| *B60T 13/68* | (2006.01) | |
| *B60W 20/14* | (2016.01) | |

(52) U.S. Cl.
CPC .......... *B60T 8/4072* (2013.01); *B60T 8/4086* (2013.01); *B60T 13/161* (2013.01); *B60T 13/166* (2013.01); *B60T 13/586* (2013.01); *B60T 13/662* (2013.01); *B60T 13/686* (2013.01); *B60W 10/08* (2013.01); *B60W 10/184* (2013.01); *B60W 20/14* (2016.01); *B60W 30/18127* (2013.01); *B60W 50/10* (2013.01); *B60L 2240/423* (2013.01); *B60L 2250/26* (2013.01); *B60T 8/4054* (2013.01); *B60W 2540/12* (2013.01); *B60W 2710/083* (2013.01); *B60W 2710/182* (2013.01); *B60Y 2300/89* (2013.01); *Y02T 10/642* (2013.01); *Y02T 90/16* (2013.01); *Y10S 903/947* (2013.01)

(58) Field of Classification Search
CPC .. B60T 8/4872; B60T 8/17616; B60T 8/3265; B60T 8/4086; B60T 8/4054; B60T 8/4072; B60T 13/586; B60T 13/161; B60T 13/166; B60T 13/662; B60T 13/686; B60T 2201/12; B60T 2270/602; B60T 2270/603; B60T 2270/608; B60L 1/003; B60L 3/108; B60L 7/18; B60L 7/26; B60L 11/1861; B60L 15/2009; B60L 2240/12; B60L 2240/423; B60L 2240/461; B60L 2250/26; B60W 10/08; B60W 10/184; B60W 20/14; B60W 30/18127; B60W 2540/12; B60W 2710/083; B60W 2710/182; B60Y 2300/89; Y10S 903/947; Y02T 10/642; Y02T 90/16
USPC ....... 303/3, 10, 15, 113.1, 116.1, 119.2, 151, 303/152
See application file for complete search history.

(56) References Cited

U.S. PATENT DOCUMENTS

| | | | |
|---|---|---|---|
| 9,421,953 | B2 | 8/2016 | Strengert et al. |
| 2010/0276240 | A1* | 11/2010 | Wuerth ................ B60L 7/003 188/358 |
| 2011/0254358 | A1* | 10/2011 | Strengert ................ B60T 1/10 303/3 |
| 2011/0285198 | A1* | 11/2011 | Nakata .................. B60K 6/445 303/3 |
| 2013/0062931 | A1* | 3/2013 | Kunz ..................... B60T 8/348 303/3 |
| 2013/0292997 | A1* | 11/2013 | Strengert ............... B60T 8/267 303/6.01 |

FOREIGN PATENT DOCUMENTS

| | | |
|---|---|---|
| CN | 102398585 A | 4/2012 |
| DE | 196 04 134 | 8/1997 |
| DE | 10 2008 004201 | 7/2009 |
| DE | 10 2010 042995 | 5/2012 |
| WO | WO 2010/069679 | 6/2010 |
| WO | 2012156125 | 11/2012 |
| WO | 2012156125 A1 | 11/2012 |

* cited by examiner

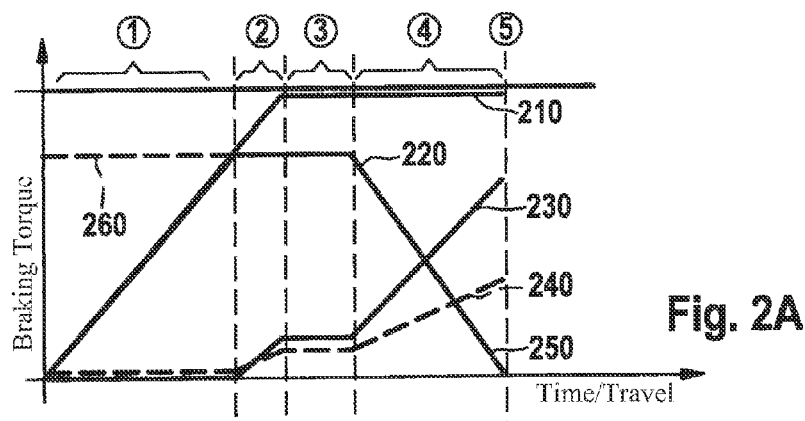
Fig. 2A
Fig. 2B
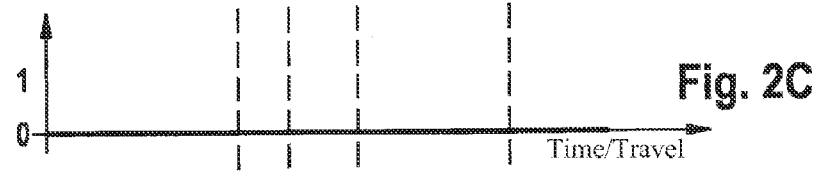
Fig. 2C
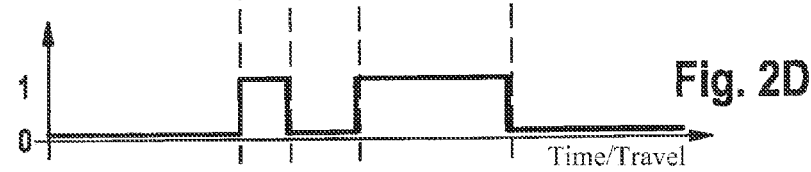
Fig. 2D

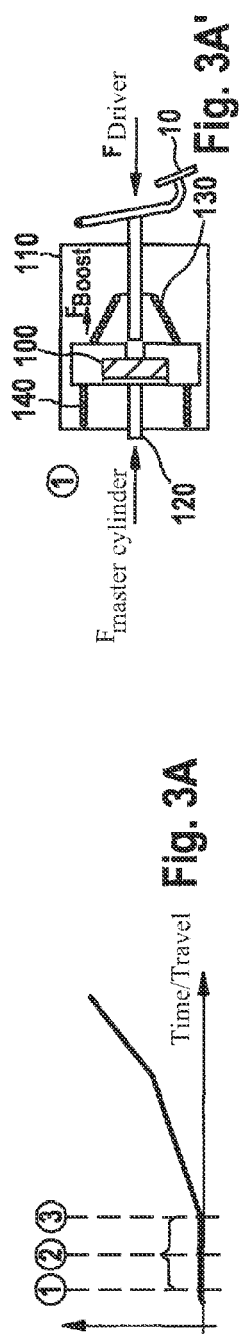
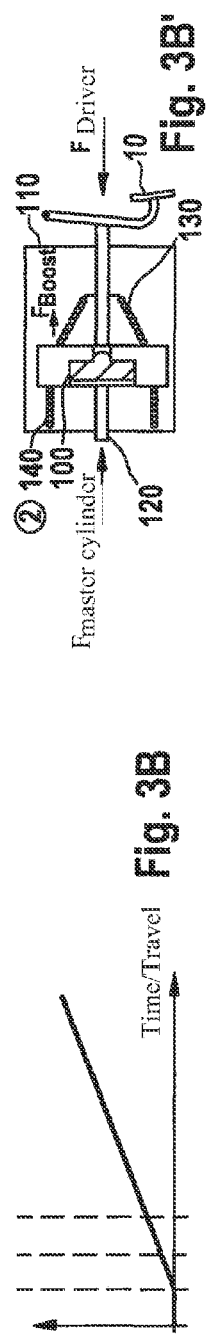

METHOD AND DEVICE FOR OPERATING A BRAKING SYSTEM

FIELD OF THE INVENTION

The present invention relates to a method and a device for operating a braking system, in particular, for use in hybrid vehicles and/or electric vehicles.

BACKGROUND INFORMATION

A conventional braking system or a method for operating such a braking system is discussed, for example, in the publication DE 10 2008 004 201 A1, in which a hydraulic layout is described, i.e., a rear axle may be decoupled with a so-called separator valve, whereas publication DE 10 2010 042 995 A1 discusses a method for blending. The teachings of these documents are herewith incorporated by reference in the present application.

A braking system in principle is assumed, as it is schematically depicted in FIG. 1 and as it corresponds essentially to the braking systems described in the aforementioned publications.

The essential components of the braking system shall be only briefly discussed with reference to FIG. 1.

Reference numeral 10 refers to a brake input element, which corresponds to a brake pedal of a motor vehicle. Attached to brake input element 10 is an actuating travel sensor 12, which senses a driver's braking input, when the driver actuates brake input element 10 for braking, i.e., for decelerating the vehicle.

Reference numeral 13 designates a brake booster, which, for example, may be configured, among other things, as a vacuum brake booster, an electrohydraulic or electromechanical brake booster, as this is also known from the related art, brake booster 13 being coupled to a brake master cylinder 14. Brake master cylinder 14 is coupled to a brake medium reservoir 16 for supplying brake medium or brake fluid, which is fillable via a filler neck 18.

Brake master cylinder 14 includes two volume chambers (not visible here), each of the volume chambers being fluidically connected to a feed line or fluid line 28 and 30. Feed lines 28, 30 are feed lines for brake medium or brake fluid, specifically, line 30 for a first brake circuit 24 (on the left side in the illustration of FIG. 1, i.e., when the position of brake master cylinder 14 is assumed to be an imaginary center of the illustration, i.e., thus, the circuit "left" of brake master cylinder 14 is the first brake circuit 24), and line 28 for a second brake circuit 20. In this configuration, first brake circuit 24, when the driver actuates brake input element 10, acts on front wheels 26a, 26b of a front axle (not depicted), each of which are coupled to brake devices 68a, 68b in a known manner. For example, these may be hydraulically actuatable disk-brake units.

In an analogous manner, when the driver actuates brake input element 10, second brake circuit 20 acts on rear wheels 22a, 22b of a rear axle (not depicted) or on (hydraulically actuatable) brake units 38a, 38b coupled thereto, as long as a separator valve 66, which is explained further below, is not closed.

It is understood that additional brake circuits for additional wheel axles are also conceivable.

Situated in the rectangle designated by reference numeral 11 and depicted with a dashed-dotted line is a system 15 of valves (controllable via a control unit not separately depicted here, for example, an ESP unit situated on board of the vehicle), which are fluidically connected to lines 28, 30, and which ensure the hydraulic activation or non-activation of brake units 38a, 38b, 68a, 68b.

For the sake of conciseness, the conventional operation of valve assembly 15 is not discussed in greater detail here, since this is already described in the aforementioned publications.

In general, the valve system 15 situated in rectangle 11 is referred to as "modulation" (modulation segment), the components situated above as "actuation" (actuation segment), and the components situated below rectangle 11 as "foundation" (foundation segment).

By way of example, however, the components and valves of first brake circuit 24 will be briefly discussed.

Reference numeral 90 refers to a so-called PCR valve (pressure control valve, controllable pressure release valve), which is controllable with respect to the flow rate of fluid, and is closed in the non-activated state.

Reference numeral 66 designates a separator valve, which is open in the non-activated state ("currentlessly open").

Valves 72a and 72b, which are currentlessly opened, are each inlet valves for the fluid for brake units 68a and 68b on wheels 26a, 26b, whereas valves 86a, 86b are outlet valves of respective brake units 68a, 68b, and are closed in the non-activated state, each of the flow rates of fluid being controllable via a throttle in a known manner. The above applies analogously to second circuit 20.

Also situated in first circuit 24 is a pressure generating device 76 (depicted here are three pump units, whereby there may be at least one or, of course also multiple units), which is designated by reference numeral 44 in second circuit 20. The pump units of pressure generating devices 76 and 44 are driven by a motor 96 having drive shafts indicated extending to the right and left but, for purposes of presentation, graphically interrupted. The pump units of pressure generating devices 76 and 44 may convey brake medium or fluid with the aid of motor 96.

Since the depicted braking system is used in hybrid vehicles or electric vehicles, a (drive motor) electric motor (there may of course also be multiple electric motors) is used when it is used as a generator for recuperation of braking energy and, therefore, electrical energy. This means that with the generator, it is possible also to brake "regeneratively" or "recuperatively", namely in addition to hydraulic braking, a replacement of hydraulic braking with regenerative braking and vice versa being referred to as "blending."

For the sake of clarity, the (at least one) electric motor is not depicted in FIG. 1.

In order to achieve a high recuperative efficiency with such a system, it has proven advantageous to introduce a hydraulic "free travel". Typically, free travel is implemented in brake master cylinder 14, on brake booster 13, or on brake input element 10. This free travel makes it possible to prevent a hydraulic pressure build-up at the so-called coupled axle (in FIG. 1 the axle with wheels 22a, 22b) up to a certain actuating travel. A driver's braking input is, however, nevertheless calculated via the pedal travel, i.e., with the aid of actuating travel sensor 12, and which may then be implemented exclusively and solely via the generator and, therefore, with very high efficiency. In the event the instantaneous generator output alone is unable to achieve the desired deceleration, an additional braking torque is then built up at the brake circuit decoupled via separator valve 66, in order to comply with the driver's deceleration input.

If the recuperative torque of the generator is no longer adequate for the desired deceleration, the missing braking torque is applied hydraulically to the decoupled axle in accordance with the driver's braking input. Very high degrees of efficiency may be achieved with the aid of this system. However, the design implementation of a free travel always entails expenditure and effort. Typically, with respect to the desired free travel, appropriately (model-) adapted "actuation" components must be manufactured. As a general rule, this adapted "actuation" may then no longer be used in conjunction with a standard system.

SUMMARY OF THE INVENTION

The present invention according to the method described herein provides a method for operating a braking system of a motor vehicle having at least one front axle and one rear axle, the braking system including: a brake booster having a brake input element to be actuated by a driver of the motor vehicle, which is coupled to an actuating travel sensor for providing a signal corresponding to a driver's braking input; a brake master cylinder coupled to the brake booster which, in turn, is coupled to a brake medium reservoir; fluid lines, which are in fluidic communication with the brake master cylinder and the brake medium reservoir on the one hand, and are in fluidic communication with braking devices on the wheels of the axles via a system of valves on the other hand, each of the wheels, in addition to the braking devices, also being coupled to at least one generator generating a braking torque; the method including the following steps: generating a hydraulic free travel with the aid of the system of valves and a corresponding control of the valves with the aid of a control unit coupled to the valves, a hydraulic pressure build-up for decelerating a wheel speed of the respective wheels being prevented by the generation of the free travel during actuation of the brake input element by the driver; and generating a regenerative braking torque on the respective wheels for decelerating the wheel speed of the respective wheels, namely on the basis of the driver's braking input.

The advantage of the provided method makes it possible to achieve a free travel by correspondingly controlling or switching the valves in the system of valves, without having to make design changes to components in the "actuation" segment. Thus, it is possible to use standard components in the "actuation" segment in a simple and cost-effective manner.

It is also possible to simultaneously carry out a blending on both axles in virtually the entire deceleration range, and to thereby achieve a recuperative efficiency of 100% even at greater decelerations. As a result of the hydraulic pressure build-up on the brake master cylinder (HZ) level (front axle pressure=rear axle pressure), the vehicle stability may be improved during braking as compared to a braking system, which is able to blend on only one axle, since a brake force distribution (front axle/rear axle) close to the ideal or to the installed brake force distribution is achievable.

The step of generating the hydraulic free travel during actuation of the brake input element by the driver may include a transferring of brake medium into a brake medium reservoir, namely due to valves opened by the control unit, which are situated between the brake medium reservoir and the pressure generating device.

It also may be that at least one valve of the system of valves is a separator valve, and at least one valve is a PCR valve, the separator valve and the PCR valve being opened during actuation of the brake input element by the driver, so that brake medium is transferred via the separator valve and the PCR valve into the brake medium reservoir.

As an additional advantage, the PCR valve is closed when the driver's braking input of the maximum available regenerative braking torque is exceeded, so that up to this point in time transferred brake medium is available for a hydraulic braking by the braking devices, and is conveyed via the pressure generating device, configured as a pump, to the braking devices.

The motor vehicle is advantageously brought to a stop by the hydraulic braking, the regenerative braking torque invariably dropping to zero and a hydraulic pressure prevailing in the brake master cylinder, which would otherwise prevail without the generation of the hydraulic free travel, and identical pressures prevailing at the braking devices of the at least two axles.

The method may also include a step of activating the pressure device/volume conveying device (pump), in order to convey brake medium from the brake fluid reservoir back into the brake master cylinder when the separator valve is opened and the PCR valve is closed.

Moreover, it may be that at least one generator for generating a braking torque acts on the at least one front axle and/or the at least one rear axle.

Inlet valves of the braking devices may remain opened, so that in all driving situations the wheels, in addition to regenerative deceleration, may also be hydraulically decelerated.

Finally, it may be that the braking system includes at least two brake circuits, each of which are associated with the at least one front axle and the at least one rear axle, the method also including a step of closing the separator valve, so that the brake circuit associated with the front axle may be decoupled by the brake master cylinder from the brake circuit associated with the at least one rear axle, in order to obtain different braking behaviors for the front and rear axle, respectively. In other words, the rear axle in this case is decoupled by closing the separator valve.

The present invention is described below on the basis of specific embodiments in conjunction with the figures.

BRIEF DESCRIPTION OF THE DRAWINGS

FIGS. 2A, 2B, 2C and 2D show diagrams for explaining the method according to one specific embodiment of the present invention.

FIGS. 3A, 3B and 3C and 3A', 3B' and 3C' show various situations of a braking operation, depicted by way of example in schematic cross-sectional views of a brake booster (FIGS. 3A' through 3C') and associated diagrams (FIGS. 3A through 3C) for better understanding.

DETAILED DESCRIPTION

Figure 1:
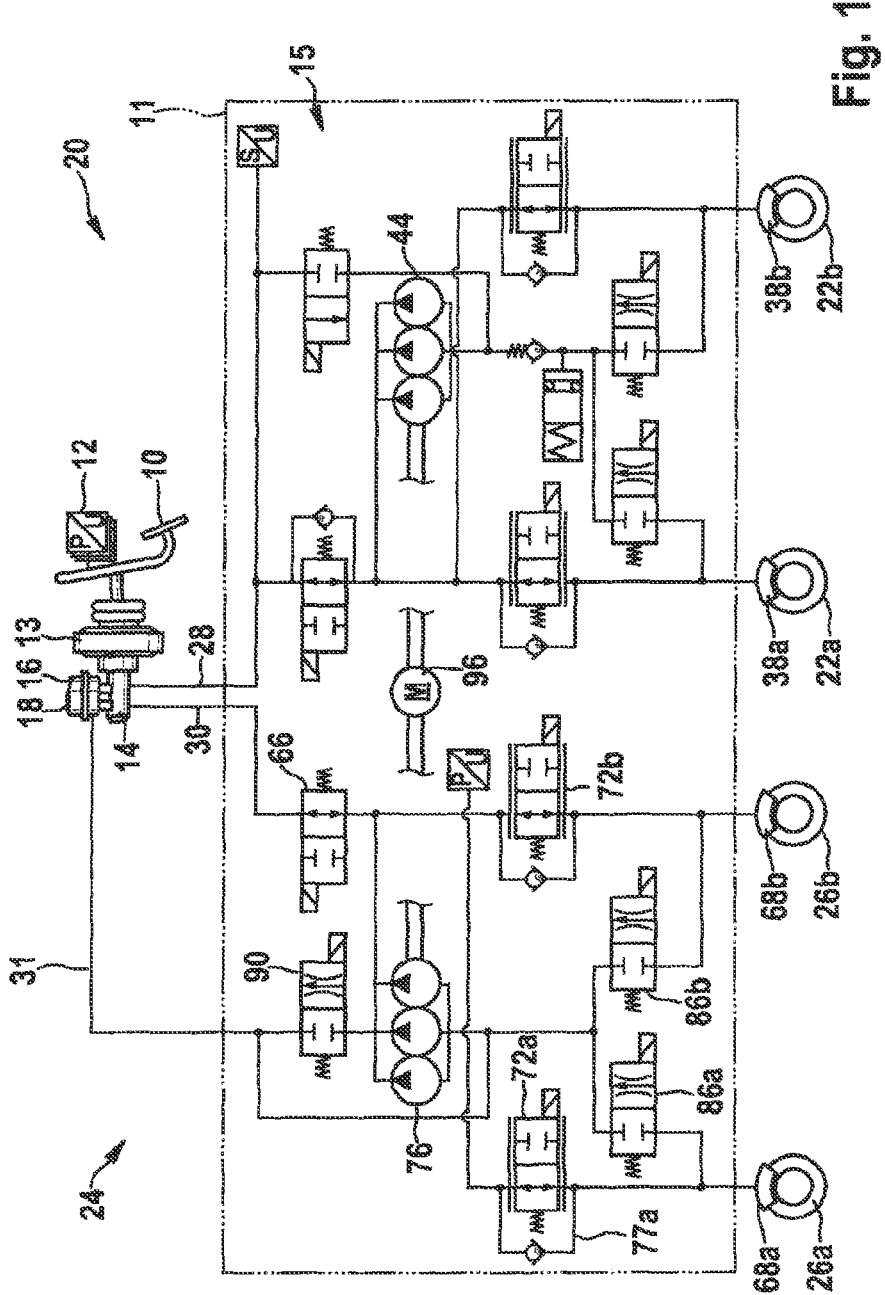
FIG. 1 shows a schematic hydraulic circuit diagram, on the basis of which a method according to one specific embodiment of the present invention is explained.

The hydraulic circuit diagram underlying the present invention is schematically depicted in FIG. 1 and, with respect to its components, already largely explained above, for which reason a further description of FIG. 1 at this point will be omitted, since the present invention results from the manner in which the valves are controlled, etc. and not from the nature of the components themselves.

The method according to the present invention is explained in the following with reference to the FIGS. 2A through 2D, and with the aid of the circuit diagram from FIG. 1.

The diagrams depicted in FIGS. 2A through 2D each show, in chronological (or traveled distance) dependency (x-axis), a curve of braking torques (FIG. 2A), states of valves (FIG. 2B, with respect to PCR valve 90 and separator valve 66), (FIG. 2C, with respect to the inlet valves) and the pump units of pressure generating devices 76, 44 (FIG. 2D), when the driver actuates brake input element 10.

In this case, the diagrams are each subdivided into chronologically (or with respect to a travel) continuous phases 1 through 4, and a point of time 5.

In the diagram in FIG. 2A, the reference numeral 210 designates a driver's braking input, 220 a generator braking torque, 230 a hydraulic braking torque of the front axle, 240 a hydraulic braking torque of the rear axle, and 260 a maximum generator potential applicable by the generator.

Phase 1 shows the depiction of the free travel. Here, for example, within the so-called "jump-in range", see diagram in FIG. 3A (i.e., when the brake input element 10 actuated by the driver contacts the so-called "reaction disk" 100 (FIGS. 3A' through 3C'); reference is also made here to the detailed description of the aforementioned publications) PCR valve 90 is opened when the separator valve 66 is open (FIG. 2B).

As a result, the driver, when actuating brake input element 10, displaces volume from a second chamber of master cylinder 14 (HZ2) via separator valve 66 and PCR valve 90 into reservoir 16 (see FIG. 1). By constraining the piston in master cylinder 14, there is no pressure build-up in a first chamber (HZ1) of master cylinder 14. Nor is a braking torque applied to brake calipers on braking devices 38a, 38b of the rear axle, even when inlet valves 72a, 72b are opened, since the so-called breakaway torque of the brake calipers is greater than the "reservoir pressure" in reservoir 16. Up to 100% of the braking torque is applied as regenerative torque, for example, by a generator on the front axle. For this reason, the braking torque in phase A (FIG. 2A) continually increases.

In phase 2, the driver's braking input (sensed by actuating travel sensor 12 in FIG. 1) exceeds the maximum available generator torque (indicated by a horizontal dashed line in phase 1 in FIG. 2A), so that additional hydraulic braking torque must be built up in order to comply with the driver's braking input. For this purpose, PCR valve 90 is closed again, so that the volume displaced by the driver as of this point for building up braking pressure reaches the braking devices 68a, 68b, 38a, 38b.

Since the hydraulic braking system exhibits a low hydraulic rigidity in the low pressure range (volume to pressure), volume must be introduced into the braking system via return feed hydraulic or pressure generating device 76. The brake pressure in this case is built up simultaneously on both brake circuits 24, 20 (FIG. 1). For this purpose, all inlet valves 72a, 72b (analogous to second circuit 20) remain advantageously opened (see FIG. 2C), so that by constraining the piston in brake master cylinder 14, identical pressures result on both axles. This is referred to as "blending at the system level" or master cylinder (HZ) blending.

In phase 3, both the driver's braking input and the available recuperative braking torque remain constant (see FIG. 2A), so that an activation of the braking system in addition is not required.

During phase 4, the generator potential becomes zero, since the vehicle has come to a stop. Therefore the omitted recuperative braking torque must be replaced by a hydraulic braking torque, this occurs in turn by HZ blending, until the hydraulic pressure is present again on both axles, which would be present even without a previous free travel depiction.

This is implemented, as in phase 2, by activating the return feed hydraulic or pressure generating device 76 (see FIG. 1) when separator valve 66 is open and PCR valve 90 is closed (see FIG. 2B).

Subsequent to point (5), separator valve 66 may be advantageously closed again (FIG. 2B), in order to utilize the known activation strategy with the so-called "by-wire" mode (see cited related art).

It is, of course, also possible to apply the method described above to a vehicle having a generator on the rear axle, or to a vehicle, in which the generator acts on all four wheels. In particular, in the case of a generator on the rear axle, it is also possible to apply the conventional method, namely, "over-braking of the rear axle", which contributes to an increase in efficiency. Here, too, it is possible with the method to dispense with an additional free travel in the components in the actuation segment in a cost-saving manner.

Finally, for a better understanding, the depictions and associated diagrams in FIGS. 3A' through 3C' will be briefly discussed, although this may be found in the related art.

FIGS. 3A' through 3C' schematically show in a cross sectional view a booster body 110 of a brake booster, including brake input element 10. Situated inside booster body 120 is an elastic reaction disk 100, in addition to spring elements 130, 140 in a known manner. An output element 120 is coupled to master cylinder 14, which acts with a force $F_{HZ}$ counter to force $F_{driver}$ applied by the driver.

In the states 1 and 2, the driver actuates brake input element 10 and, as explained above, volume or medium is displaced. The braking in this case is not hydraulic, but rather regenerative (see also phase 1 in FIG. 2A). This is also shown in diagram 3A, where (in the so-called "jump-in range") no (hydraulic force) is generated, braking is merely regenerative (see FIG. 3B and FIG. 3C).

Only in state 3 (FIG. 3C') does brake input element 10 contact elastic reaction disk 100 and, as explained above, the braking is hydraulic.

The method is based on the utilization of the properties of a brake booster 13. In this case, the "jump-in" property is utilized in particular, see FIG. 3.

Thus, the method according to the present invention utilizes in an advantageous manner the jump-in range, in order "to disguise" a pressure manipulation for the driver, since the driver perceives no force feedback in this range due to the hydraulic pressure.

In the jump-in range, the pedal force applied by the driver is nearly constant, i.e., the driver sets the initial pressure and, therefore, the deceleration, purely via the pedal travel, the power ratio between driver force and initial pressure in this case is theoretically infinite. Conversely, however, this also means that variations in the initial pressure are not perceptible as pedal force variations on the driver's foot. As a result, it is possible that (wheel) pressure variations in this range may be carried out largely unnoticed by the driver.

Typically, the jump-in range in modern vehicles is as much as approximately 0.15 g or 0.2 g.

Alternatively, the method may also be used with an active brake booster, which is able to compensate for the reduced pedal force due to the absence of hydraulic counter-pressure by withdrawing the boosting force.

What is claimed is:

1. A method for operating a braking system of a motor vehicle having at least one front axle and one rear axle, the method comprising:

generating a hydraulic free travel with the aid of a system of valves and a corresponding control of the valves with the aid of a control unit coupled to the valves, a hydraulic pressure build-up for decelerating a wheel speed of respective wheels being prevented by the generation of the free travel during an actuation of a brake input element by a driver; and generating a regenerative braking torque on the respective wheels for decelerating the wheel speed of the respective wheels, based on the driver's braking input;

wherein the braking system includes:
a brake booster having the brake input element to be actuated by the driver of the motor vehicle, which is coupled to an actuating travel sensor for providing a signal corresponding to a driver's braking input;
a brake master cylinder coupled to the brake booster which is coupled to a brake medium reservoir; and
fluid lines, which are in fluidic communication with the brake master cylinder and the brake medium reservoir, and are in fluidic communication with the braking devices on the wheels of the axles via the system of valves, each of the wheels, in addition to the braking devices, being coupled to generators generating a braking torque, wherein inlet valves of the braking devices remain opened, so that in all driving situations at least the wheels, in addition to regenerative deceleration, are also hydraulically decelerate-able and by constraining a piston in the brake master cylinder identical pressures result on the front and rear axles.

2. The method of claim 1, wherein the generating of the hydraulic free travel during actuation of the brake input element by the driver includes a transfer of brake medium into the brake medium reservoir, due to valves opened by the control unit, which are situated between the brake medium reservoir and a pressure generating device.

3. The method of claim 1, wherein at least one valve of the system of valves is a separator valve, and at least one valve is a pressure release valve (PCR valve), the separator valve and the PCR valve being opened during the actuation of the brake input element by the driver, so that brake medium is transferred via the separator valve and the PCR valve into the brake medium reservoir.

4. The method of claim 3, wherein the PCR valve is closed again when the driver's braking input of the maximum available regenerative braking torque is exceeded, so that up to this point in time transferred brake medium is available for a hydraulic braking by the braking devices, and is conveyed via a pressure generating device, configured as a pump, to the braking devices.

5. The method of claim 4, wherein the motor vehicle is brought to a stop by the hydraulic braking, the regenerative braking torque invariably dropping to zero and a hydraulic pressure prevailing in the brake master cylinder, which would otherwise prevail without the generation of the hydraulic free travel, and identical pressures prevailing on the braking devices of the at least two axles.

6. The method of claim 5, further comprising:
activating the pressure generating device to convey brake medium back into the brake master cylinder when the separator valve is opened and the PCR valve is closed.

7. The method of claim 1, wherein at least one generator for generating a braking torque acts on the at least one front axle and/or the at least one rear axle.

8. The method of claim 1, wherein the braking system includes at least two brake circuits, each of which is associated with the at least one front axle and the at least one rear axle, further comprising:

closing the separator valve, so that the brake circuit associated with the front axle may be decoupled by the brake master cylinder from the brake circuit associated with the at least one rear axle, to obtain different braking behaviors for the front and rear axle, respectively, so that the rear axle is decoupled by closing the separator valve.

9. The method of claim 1, wherein the method and the braking system are used in a hybrid vehicle and/or an electric vehicle.

10. A braking system of a motor vehicle having at least one front axle and one rear axle, comprising:
a brake booster having a brake input element to be actuated by a driver of the motor vehicle, which is coupled to an actuating travel sensor for providing a signal corresponding to a driver's braking input;
a brake master cylinder coupled to the brake booster which is coupled to a brake medium reservoir; and
fluid lines, which are in fluidic communication with the brake master cylinder and the brake medium reservoir, and are in fluidic communication with braking devices on the wheels of the axles via the system of valves, each of the wheels, in addition to the braking devices, being coupled to generators generating a braking torque;
wherein the braking system is operable by performing the following:
generating a hydraulic free travel with the aid of the system of valves and a corresponding control of the valves with the aid of a control unit coupled to the valves, a hydraulic pressure build-up for decelerating a wheel speed of respective wheels being prevented by the generation of the free travel during an actuation of a brake input element by the driver; and
generating a regenerative braking torque on the respective wheels for decelerating the wheel speed of the respective wheels, based on the driver's braking input, wherein inlet valves of the braking devices remain opened, so that in all driving situations at least the wheels, in addition to regenerative deceleration, are also hydraulically decelerate-able and by constraining a piston in the brake master cylinder identical pressures result on the front and rear axles.

11. The braking system of claim 10, wherein the braking system is used in a hybrid vehicle and/or an electric vehicle.

12. A method for operating a braking system of a motor vehicle having at least one front axle and one rear axle, the method comprising:
generating a hydraulic free travel with the aid of a system of valves and a corresponding control of the valves with the aid of a control unit coupled to the valves, a hydraulic pressure build-up for decelerating a wheel speed of respective wheels being prevented by the generation of the free travel during an actuation of a brake input element by a driver, wherein the generating of the hydraulic free travel during actuation of the brake input element by the driver includes a transfer of brake medium into a brake medium reservoir with the aid of valves of the system of valves that are opened by the control unit, which are situated between the brake medium reservoir and a pressure generating device; and
generating a regenerative braking torque on the respective wheels for decelerating the wheel speed of the respective wheels, based on the driver's braking input;
wherein the braking system includes:
a brake booster having the brake input element to be actuated by the driver of the motor vehicle, which is coupled to an actuating travel sensor for providing a signal corresponding to a driver's braking input;

a brake master cylinder coupled to the brake booster which is coupled to the brake medium reservoir; and fluid lines, which are in fluidic communication with the brake master cylinder and the brake medium reservoir, and are in fluidic communication with the braking devices on the wheels of the axles via the system of valves, each of the wheels, in addition to the braking devices, being coupled to generators generating a braking torque, wherein inlet valves of the braking devices remain opened, so that in all driving situations at least the wheels, in addition to regenerative deceleration, are also hydraulically decelerate-able and by constraining a piston in the brake master cylinder identical pressures result on the front and rear axles.

13. The method of claim 12, wherein at least one valve of the system of valves is a separator valve, and at least one valve is a pressure release valve (PCR valve), the separator valve and the PCR valve being opened during the actuation of the brake input element by the driver, so that brake medium is transferred via the separator valve and the PCR valve into the brake medium reservoir.

14. The method of claim 13, wherein the PCR valve is closed again when the driver's braking input of the maximum available regenerative braking torque is exceeded, so that up to this point in time transferred brake medium is available for a hydraulic braking by the braking devices, and is conveyed via the pressure generating device, configured as a pump, to the braking devices.

15. The method of claim 14, wherein the motor vehicle is brought to a stop by the hydraulic braking, the regenerative braking torque invariably dropping to zero and a hydraulic pressure prevailing in the brake master cylinder, which would otherwise prevail without the generation of the hydraulic free travel, and identical pressures prevailing on the braking devices of the at least two axles.

16. The method of claim 15, further comprising:
activating the pressure generating device to convey brake medium back into the brake master cylinder when the separator valve is opened and the PCR valve is closed.

17. The method of claim 12, wherein inlet valves of the braking devices remain opened, so that in all driving situations at least the wheels, in addition to regenerative deceleration, are also hydraulically decelerate-able.

18. The method of claim 12, wherein the braking system includes at least two brake circuits, each of which is associated with the at least one front axle and the at least one rear axle, further comprising:

closing the separator valve, so that the brake circuit associated with the front axle may be decoupled by the brake master cylinder from the brake circuit associated with the at least one rear axle, to obtain different braking behaviors for the front and rear axle, respectively, so that the rear axle is decoupled by closing the separator valve.

19. A braking system of a motor vehicle, comprising:
at least one front axle and one rear axle;
a brake booster having a brake input element to be actuated by a driver of the motor vehicle, which is coupled to an actuating travel sensor for providing a signal corresponding to a driver's braking input;
a brake master cylinder coupled to the brake booster which is coupled to a brake medium reservoir;
fluid lines, which are in fluidic communication with the brake master cylinder and the brake medium reservoir, and are in fluidic communication with braking devices on wheels of the axles via a system of valves, each of the wheels, in addition to the braking devices, being coupled to generators generating a braking torque
an arrangement for generating a hydraulic free travel with the aid of the system of valves and a corresponding control of the valves with the aid of a control unit coupled to the valves, a hydraulic pressure build-up for decelerating a wheel speed of the respective wheels being prevented by the generation of the free travel during an actuation of the brake input element by the driver, wherein the generating of the hydraulic free travel during actuation of the brake input element by the driver includes a transfer of brake medium into the brake medium reservoir with the aid of valves of the system of valves that are opened by the control unit, which are situated between the brake medium reservoir and a pressure generating device; and
an arrangement for generating a regenerative braking torque on the respective wheels for decelerating the wheel speed of the respective wheels, based on the driver's braking input, wherein the braking system is usable in at least one of a hybrid vehicle and an electric vehicle, wherein inlet valves of the braking devices remain opened, so that in all driving situations at least the wheels, in addition to regenerative deceleration, are also hydraulically decelerate-able and by constraining a piston in the brake master cylinder identical pressures result on the front and rear axles.

* * * * *